US009525497B2

(12) United States Patent
Li et al.

(10) Patent No.: US 9,525,497 B2
(45) Date of Patent: Dec. 20, 2016

(54) INTERFERENCE PROCESSING IN WIRELESS COMMUNICATION

(71) Applicant: INTERNATIONAL BUSINESS MACHINES CORPORATION, Armonk, NY (US)

(72) Inventors: Yu Bo Li, Beijing (CN); Yong Hua Lin, Beijing (CN); Jianbin Tang, Carlton (AU); Jun Song Wang, Beijing (CN); Qi Jun Wang, Beijing (CN); Qing Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/717,291

(22) Filed: May 20, 2015

(65) Prior Publication Data
US 2015/0349895 A1 Dec. 3, 2015

(30) Foreign Application Priority Data

May 29, 2014 (CN) .......................... 2014 1 0232455

(51) Int. Cl.
*H04B 15/00* (2006.01)
*H04W 72/08* (2009.01)
(Continued)

(52) U.S. Cl.
CPC ............ *H04B 15/00* (2013.01); *H04B 1/0082* (2013.01); *H04W 24/10* (2013.01); *H04W 72/082* (2013.01)

(58) Field of Classification Search
CPC ......... H04B 1/0082; H04B 1/10; H04B 15/00; H04B 17/345; H04W 24/02; H04W 24/10; H04W 72/082; H04W 88/08; H04W 36/20; H04W 40/16
See application file for complete search history.

(56) References Cited

U.S. PATENT DOCUMENTS 6,229,997 B1 * 5/2001 Addy .................. H04B 17/345
455/1
8,055,213 B2 * 11/2011 Hui ..................... H04B 17/382
370/329
(Continued)

OTHER PUBLICATIONS

P. Janis, "Interference management techniques for cellular wireless communication systems," Aalto University publication series Doctoral Dissertations, 2013, pp. 1-109.
(Continued)

*Primary Examiner* — Andrew Wendell
(74) *Attorney, Agent, or Firm* — Cantor Colburn LLP; Keivan Razavi

(57) ABSTRACT

A method for processing interference in wireless communication at a base station, wherein at least some of a plurality of (Radio Frequency) RF channels in the base station operates at a current operating frequency point assigned to the base station includes detecting interference of one or more candidate frequency points by using at least one RF channel, wherein the one or more candidate frequency points are different from the current operating frequency point; reporting result of detecting interference of the one or more candidate frequency points to a resource manager; and in response to the resource manager assigning one of the one or more candidate frequency points to the base station, notifying a user to switch from the current operating frequency point to the assigned candidate frequency point.

10 Claims, 5 Drawing Sheets

(51) Int. Cl.
*H04W 24/10* (2009.01)
*H04B 1/00* (2006.01)

(56) References Cited

U.S. PATENT DOCUMENTS

| | | | |
|---|---|---|---|
| 8,655,300 B2 | 2/2014 | Kapoor et al. | |
| 2006/0023664 A1* | 2/2006 | Jeong | H04H 20/57 370/329 |
| 2007/0287464 A1* | 12/2007 | Hamamoto | H04L 5/06 455/447 |
| 2008/0063012 A1* | 3/2008 | Nakao | H04L 27/2657 370/500 |
| 2009/0135754 A1* | 5/2009 | Yavuz | H04W 74/04 370/311 |
| 2010/0178924 A1* | 7/2010 | Kashiwase | H04W 36/30 455/438 |
| 2010/0227562 A1 | 9/2010 | Shim et al. | |
| 2012/0028663 A1 | 2/2012 | Nejatian et al. | |
| 2012/0108276 A1 | 5/2012 | Lang et al. | |
| 2012/0244897 A1 | 9/2012 | Yang et al. | |
| 2013/0065562 A1* | 3/2013 | Singh | H04L 12/1492 455/414.1 |
| 2013/0089038 A1* | 4/2013 | Hannu | H04W 76/046 370/329 |
| 2013/0090141 A1 | 4/2013 | Hottinen | |
| 2013/0190028 A1* | 7/2013 | Wang | H04W 36/06 455/509 |
| 2013/0230019 A1 | 9/2013 | Manssour et al. | |
| 2015/0318944 A1* | 11/2015 | Wigren | H04W 52/40 370/230 |
| 2015/0351107 A1* | 12/2015 | Li | H04B 15/00 370/252 |

OTHER PUBLICATIONS

List of IBM Patents or Patent Applications Treated as Related; Date File: May 20, 2015, pp. 1-2.
List of IBM Patents or Patent Applications Treated as Related; (Appendix P), Date Filed Jun. 10, 2016; 2 pages.
Yu Bo Li, et al., "Interference Processing in Wireless Communication," U.S. Appl. No. 14/745,836, filed Jun. 22, 2015.

* cited by examiner

INTERFERENCE PROCESSING IN WIRELESS COMMUNICATION

FOREIGN PRIORITY

This application claims priority to Chinese Patent Application No. 201410232455.6, filed May 29, 2014, and all the benefits accruing therefrom under 35 U.S.C. §119, the contents of which in its entirety are herein incorporated by reference.

BACKGROUND

The present invention relates to wireless communication, and in particular, to a method and system for processing interference in wireless communication.

In wireless communication field, with development of technology, application of wide band system has been increasingly improved. However, due to various factors, there are still cases that some legacy analogy wireless systems or narrow band digital wireless systems co-exist with current wide band system. These narrow band systems usually occupy excellent frequency band, since they have very narrow frequency bandwidth, their data rates are also very low, therefore, it is possible to build a new wide band system within frequency band of these narrow band systems, and share frequency band with them. For the new wide band system, all in-band signals coming from legacy heterogeneous system were treated as interferences. Since signals of interferences per se are strong and variable, it is a big challenge to make the wide band system to co-exist with these strong interference signals.

SUMMARY

In view of the above problems, a solution for processing interference in wireless communication at a base station is provided herein.

According to one embodiment of the present invention, there is provided a method for processing interference in wireless communication at a base station, wherein at least some of a plurality of RF (Radio Frequency) channels in the base station operates at a current operating frequency point assigned to the base station, the method comprising: detecting interference of one or more candidate frequency points by using at least one RF channel, wherein the one or more candidate frequency points are different from the current operating frequency point; reporting result of detecting interference of the one or more candidate frequency points to a resource manager; and in response to the resource manager assigning one of the one or more candidate frequency points to the base station, notifying user to switch from the current operating frequency point to the assigned candidate frequency point.

According to one embodiment of the present invention, there is also provided a system for processing interference in wireless communication at a base station, wherein at least some of a plurality of RF channels in the base station operates at a current operating frequency point assigned to the base station, the system comprising: a candidate frequency point detection module configured to detect interference of one or more candidate frequency points by using at least one RF channel, wherein the one or more candidate frequency points are different from the current operating frequency point; a reporting module configured to report result of detecting interference of the one or more candidate frequency points to a resource manager; and a user communication module configured to, in response to the resource manager assigning one of the one or more candidate frequency points to the base station, notify user to switch from the current operating frequency point to the assigned candidate frequency point.

With the above method and system, it is possible to detect whether a better frequency point is available without stopping current service.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
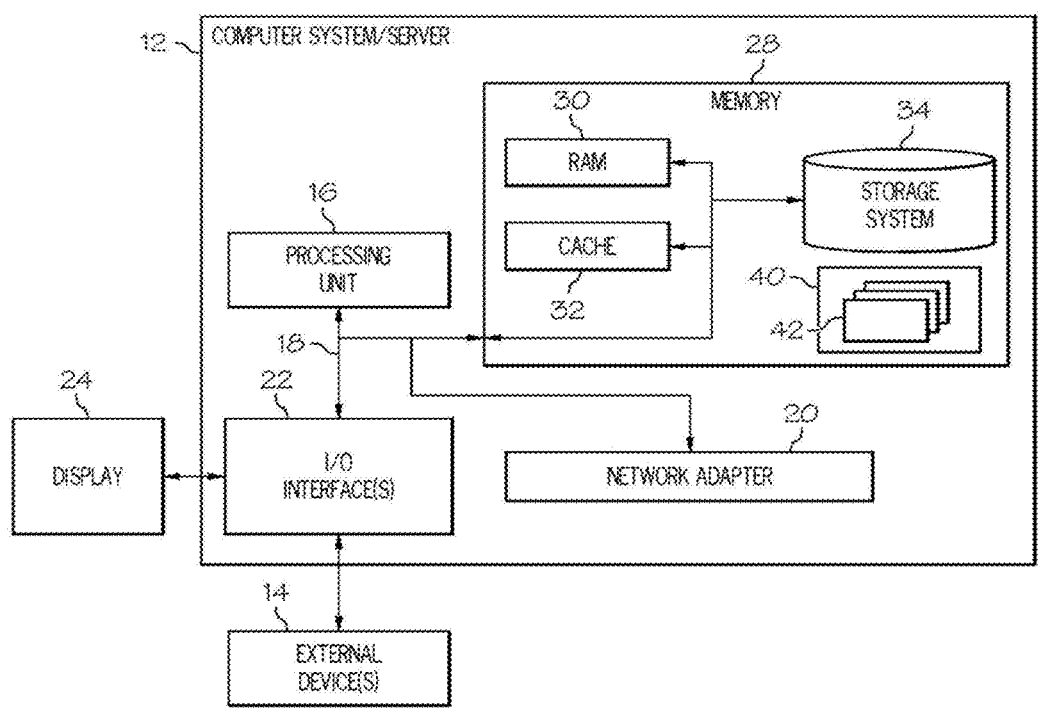
FIG. 1 shows a block diagram of an exemplary computer system/server which is applicable to implement the embodiments of the present invention.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Before describing embodiments of the present invention, the concept of frequency point in wireless communication field will be first introduced. The transmission frequency of a radio signal may contain an uplink signal sent from a mobile station to a base station and a downlink signal sent from a base station to a mobile station. For example, the operating frequency band for GSM900 is about 890-960 MHz, and the operating frequency band for GSM 1800 is about 1710-1880 MHz, wherein the uplink frequency band by which a mobile station sends signal to a base station is about 890-915 MHz for GSM 900, and is about 1710-1785 MHz for GSM 1800. The downlink frequency band by which a base station sends signal to a mobile station is about 935-960 MHz for GSM 900, and is about 1805-1880 MHz for GSM 1800. The frequency point refers to a number assigned to a fixed frequency, for example, frequency intervals are all 200 KHz, thus according to this frequency interval of 200 KHz, a frequency band is divided into a plurality of wireless frequency bands, e.g., 890 MHz, 890.2 MHz, 890.4 MHz, 890.6 MHz, 890.8 MHz, 891 MHz . . . 915 MHz, which are numbered from 1, 2, 3, 4 . . . , etc. These numbers for the fixed frequency are the so called "frequency point." In a wireless communication network, the term frequency point may be used instead of frequency to designate transmission frequency of a transceiver. For example, designating frequency point of a carrier as 3 means that the carrier will receive uplink signals whose frequency are 890.4 MHz and transmit signals at frequency of 935.4 MHz. In the context of the present disclosure, frequency point is used instead of frequency to designate transmission frequency of a wireless signal.

Figure 2:
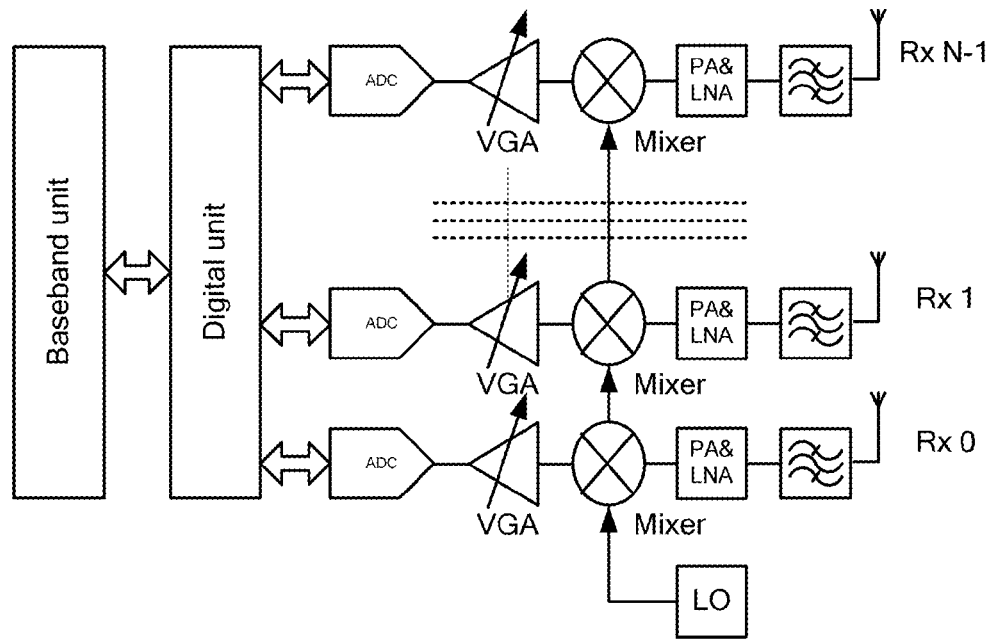
FIG. 2 is a schematic view of an example of a conventional multi-antenna RF unit.

FIG. 2 shows an example of a conventional multi-antenna RF unit in a base station. The base station receives and transmits signal through this RF unit. Each base station is assigned an operating frequency point, and the RF unit operates at this operating frequency point. Taking a process that the base station receives signal from a terminal user for example, a plurality of RF channels receive signal from the user respectively through their own antenna Rx0, Rx1, . . . RxN−1, and these antenna Rx0, Rx1, . . . RxN−1 are located at different positions, and have same operating frequency point, e.g. $f_{R1}$. The received signal is passed through a filter, a low noise amplifier LNA to a mixer, and is mixed with a local oscillation signal with frequency $f_{LO}$ from a local oscillator LO, such that frequency of the signal is changed to $f_M$. Then, the signal is further passed through a variable gain amplifier VGA, an AD converter ADC to a digital unit, after a series of digital down conversion and filter, the signal is converted to a baseband signal, and is transmitted to a baseband unit for further processing.

For signal sent from the base station, it is subjected to an opposite process, that is, it is passed from the baseband unit to the antenna, and is sent out.

From the example in FIG. 2, it can be seen that in this RF unit, a same local oscillation signal $f_{LO}$ is provide to the plurality of RF channels by the local oscillator LO.

For interference of in-band signals, since the interference varies over time, if the base station detects that in-band interference at operating frequency point $f_{R1}$ is too high, then the base station needs to find another better candidate frequency point. For example, the solution shown in FIG. 2 needs to periodically or non-periodically stop service at the current operating frequency point, and detects all the other candidate frequency points. Furthermore, if there are a lot of candidate frequency points, the time to stop the service at the current frequency point will be significantly increased.

In view of the above problem, it is proposed that an RF channel operating at an operating frequency point different from the current operating frequency point may be used to perform channel quality detection, so as to avoid stopping service at the current operating frequency point and prevent problems caused by the stopping.

Figure 3:
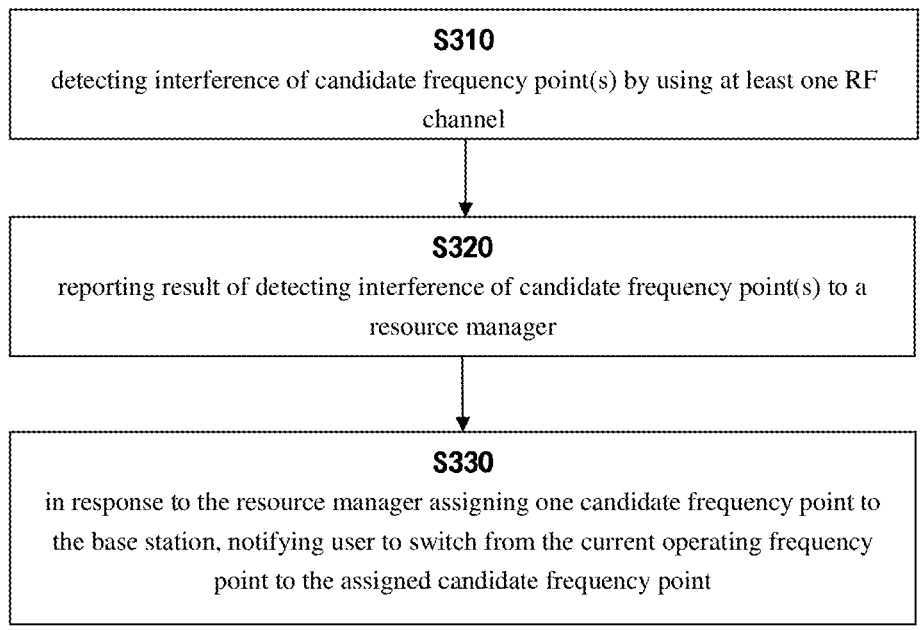
FIG. 3 is a flowchart of a method for processing interference according to one embodiment of the present invention.

Next, a method for processing interference in wireless communication according to one embodiment of the present invention will be described with reference to FIG. 3, wherein the base station comprises a plurality of RF channels. At least some of the plurality of RF channels operates at a current operating frequency point. The current operating frequency point is a frequency point assigned to the base station by a resource manager in the radio network.

In operation S310, detecting interference of one or more candidate frequency points by using at least one RF channel, wherein the one or more candidate frequency points are different from the current operating frequency point.

According to one embodiment of the present invention, detecting interference of candidate frequency points comprises: configuring operating frequency point of the at least one RF channel as one of the one or more candidate frequency points; and detecting interference level of that candidate frequency point. By detecting candidate frequency points by using one RF channel operating at a frequency point different from the current operating frequency point, service of at least some of the plurality of RF channels operating at the current operating frequency point will not be stopped while detecting interference of the one or more candidate frequency points.

According to one embodiment of the present invention, energy of interference and noise may be used as a parameter for interference level to perform frequency point detection.

Given frequency point resource f1, f2, . . . fn, and current operating frequency point currently being used by the base station is fx, then candidate frequency points other than fx are scanned by using one or more RF channels. If the scan is only performed once, then average energy E1, E2, . . . En of each frequency point over a specified period of time T are calculated. Since these frequency points do not belong to current base station, the detected energy may be regarded as energy of interference and noise. Generally, the lower the energy of interference and noise, the cleaner the spectrum resource. If the scan is performed periodically, then reasonable smoothing is conducted on E1, E2, . . . En. The smoothing may be conducted by using various methods known in the art, such as moving average method, first order filter method, and so on.

According to another embodiment of the present invention, average signal to interference plus noise ratio may also be used as a parameter for interference level to perform frequency point detection.

Given frequency point resource f1, f2, . . . fn, and frequency point currently being used by the base station is fx, then frequency points other than fx will be scanned by using one or more RF channels. If the scan is only performed once, then average signal to interference plus noise ratio SINR1, SINR2, . . . , SINRn of each frequency point over a specified period of time T are calculated. Generally, the higher the signal to interference plus noise ratio, the cleaner the spectrum resource Likely, if the scan is performed periodically, then SINR1, SINR2, . . . SINRn will be reasonably smoothed.

In addition, the detection may also be performed by using other frequency point interference detection methods known in the art.

In operation S320, reporting result of detecting interference of the one or more candidate frequency points to a resource manager.

According to one embodiment of the present invention, energy of interference and noise of the frequency point currently being used may be compared with that of other candidate frequency points, if a frequency point having lower energy of interference and noise than the current frequency point is found, then it is considered that there is better frequency point resource. The base station cannot simply select the frequency point having the lowest energy of interference and noise, it needs to report the detection result to a resource manager, and after global comparison, it is decided by the resource manager whether to assign the new frequency point to the base station.

According to another embodiment of the present invention, signal to interference plus noise ratio of the frequency point currently being used may also be calculated and compared with that of other candidate frequency points. If a frequency point having higher signal to interference plus noise ratio than the current frequency point is found, then it is considered that there is better frequency point resource. The detection result is reported to a resource manager, and after global comparison, it is decided whether to assign the new frequency point.

Alternatively, if it is found after comparison that, there is no frequency point having better quality than the current operating frequency point, then it is decided to continue to use operating frequency point of the current channel.

In response to the resource manager assigning one of the one or more candidate frequency points to the base station, in operation S330, notifying user to switch from the current operating frequency point to the assigned candidate frequency point.

According to one embodiment of the present invention, detecting interference of one or more candidate frequency points by using at least one RF channel comprises: setting local oscillator frequency of the at least one RF channel to be different from current local oscillator frequency of RF channels operating at the current operating frequency point, such that the at least one RF channel operates at one of the one or more candidate frequency points; and detecting interference level of that candidate frequency point. Wherein, local oscillator frequency of the at least one RF channel may be set through various manners.

Figure 4:
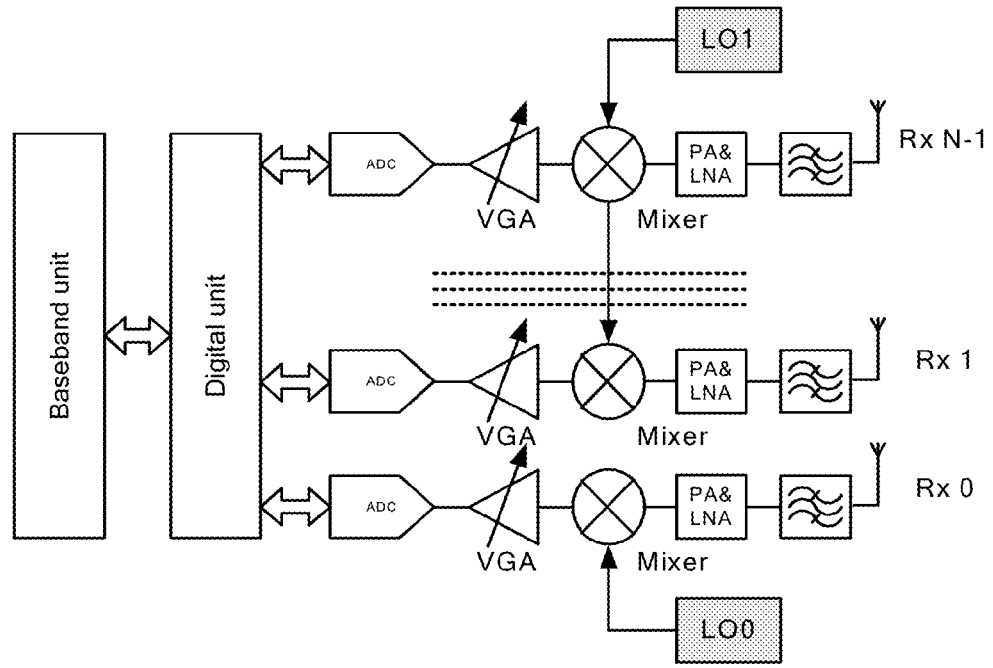
FIG. 4 is a schematic view of a multi-antenna RF unit according to one embodiment of the present invention.

According to one embodiment of the present invention, the local oscillator frequency of the RF channel which performs candidate frequency point detection may be provided by a local oscillator operating at a frequency different from the current local oscillator frequency. For example, one or more local oscillators (LOs) may be added on basis of the current system. FIG. 4 shows a schematic view of a multi-antenna RF unit according to one embodiment of the present invention. As compared to the conventional multi-antenna RF unit shown in FIG. 2, one local oscillator LO0 is added in FIG. 4. Here for brevity, only the case in which one local oscillator is added is shown, of course, a person skilled in the art would appreciated that, a solution containing more local oscillators is also within the protection scope of the present invention.

In case that there is no interference, the LO0 may operate at a frequency point that is the same as the current frequency point, that is to say, frequency of local oscillation signal provided by the LO0 is the same as the frequency provided by other local oscillators LO1. When candidate frequency points need to be detected, the LO0 may provide an oscillation frequency different from other local oscillators, such that this RF channel operates at a frequency point different from the current frequency point, thus the candidate frequency points may be detected without stopping service on the current frequency point. Furthermore, there is no significant influence on performance of the system at this time.

For example, in the RF unit shown in FIG. 4, taking a process that the base station receives signal from a terminal user for example, a plurality of RF channels receive signal with frequency point of $f_{R1}$ from the user through their own antenna Rx0, Rx1, . . . , RxN−1, respectively. The received signal is passed through a filter, a low-noise amplifier LNA to a mixer, wherein in RF channels coupled with the antenna Rx1, . . . , RxN−1, the signal is mixed with a local oscillation signal having frequency $f_{LO}$ provided by the local oscillator LO1, such that frequency of the signal after mixture is changed to $f_M$. Then, the signal is further passed through a variable gain amplifier VGA, an analog to digital converter ADC to a digital unit, after a series of digital down conversion and filter, the signal is converted to a baseband signal, and is transmitted to a baseband unit for further processing.

While on the RF channel coupled with the antenna Rx0, the signal is mixed with the local oscillation signal having frequency $f_{LO}'$ from the local oscillator LO0, thus frequency of the mixed signal is changed to $f_M'$. Then, the signal is passed through the variable gain amplifier VGA, the analog to digital converter ADC to the digital unit, after down conversion and filter, the signal is converted to a baseband signal and is transmitted to a baseband unit for further processing. At this moment, due to the local oscillation signal having a different frequency provided by the local oscillator LO0, this RF channel operates at an operating frequency point $f_{R1}'$ different from other RF channels.

Configuration of a LO may be performed by a frequency point configuration module of the base station. The frequency point configuration module may support to configure frequency point of each LO. In the conventional RF unit having only one LO, frequency point configuration will be applied to all the RF channels, that is, all the RF channels must operate at a same frequency. The present invention supports a plurality of LOs, thus the frequency point configuration module also supports to configure frequency point of each LO, thus RF channels corresponding to different LOs may operate at the same or different frequency points, and thus bring convenience in detecting different frequency points at the same time. Still further, the system is enabled to make different RF channels operate at different frequency points. By adding LO, in addition to configure frequency points, software is enabled to receive signals at different frequency points without making any change.

According to another embodiment of the present invention, in case that a same LO is used, it is also possible to support carrier frequency point change through capability of a chip. Some chips per se are capable of configure different RF frequency points for different RF channels. For example, by performing frequency combination on current local oscillator signal of the LO, a frequency different from the current local oscillator frequency may be obtained and used as local oscillator frequency of the RF channel that detects interference of candidate frequency points.

According to another embodiment of the present invention, in case that a same LO is used, it is also possible to achieve this by enabling a plurality of carriers at the same time. For example, operating frequency points of a plurality of RF channels are provided by a multi-carrier base station system, wherein the multi-carrier base station system may provide a plurality of different carriers to the plurality of RF channels, such that the RF channels are made to operate at different operating frequency points. The plurality of carriers collect signals at different frequency points at the same time, including candidate frequency points to be detected and the frequency point currently in operation.

According to one embodiment of the present invention, interference detection on candidate frequency points may be performed periodically or non-periodically. Whether to initiate interference detection on candidate frequency points may be controlled by a resource manager in the radio network. If the resource manager thinks that it is necessary to perform the detection once, it can control this through signaling. The resource manager may also configure the system so as to perform detection periodically, thus obtaining detection result periodically. Generally, if a better candidate operating frequency point can be found by performing detection once, then it is recommended to perform detection once. However, sometimes a better operating frequency point may be difficult to find at the moment, then it is necessary to perform detection multiple times or periodically.

Figure 5:
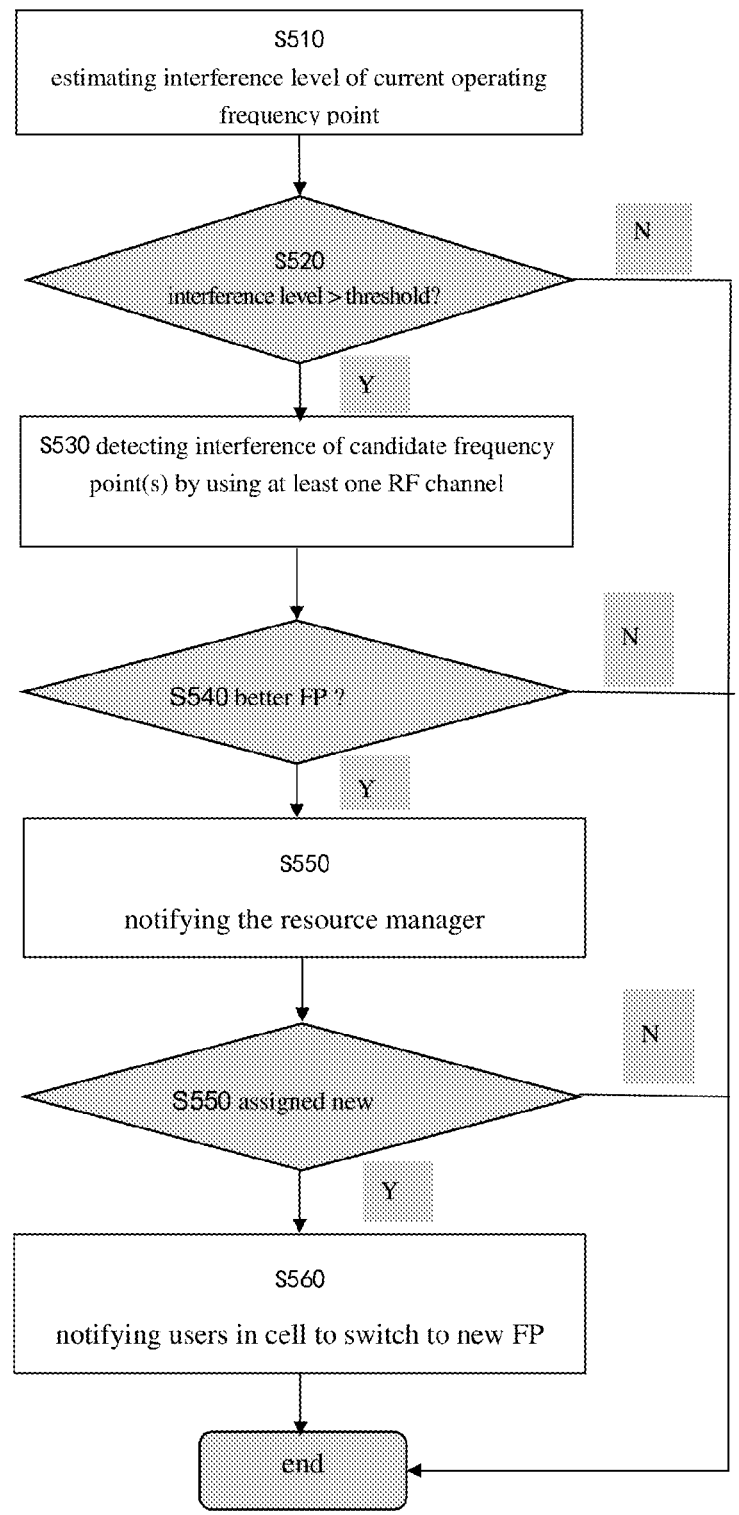
FIG. 5 is a flowchart of a method for processing interference according to another embodiment of the present invention.

Next, a method for processing interference according to another embodiment of the present invention will be described with reference to FIG. 5.

In operation S510, estimating interference level of the current operating frequency point. Wherein, the interference level may be estimated in various manners, for example, total energy (dBm) of interference and noise signal may be detected when there is no useful signal, and signal to interference plus noise ratio (SINR, in dB) may be detected when there is useful signal.

In operation S520, determining whether the interference level of the current operating frequency point exceeds a certain threshold. That certain threshold may be pre-set by user, or may be set or changed through online configuration. There are many ways to perform online configuration, for example, configuration may be done by a management interface similar to a router configuration interface, or be done by a resource manager through signaling.

If the interference level exceeds the threshold, then in operation S530, detecting interference of candidate frequency point(s) by using at least one RF channel.

In operation S540, determining whether there is better candidate frequency point, if yes, the method proceeds to operation S550, notifying to the resource manager that there is better frequency point. For example, according to one embodiment of the present invention, energy of interference and noise of the frequency point currently being used may be compared with that of other candidate frequency points, if a frequency point having lower energy of interference and noise than the current frequency point is found, then it is considered that there is better frequency point resource. Alternatively, signal to interference plus noise ratio of the frequency point currently being used is calculated and compared to that of other candidate frequency points, if a frequency point having higher signal to interference plus noise ratio than the current frequency point is found, then it is considered that there is better frequency point resource.

Generally, there is a wired connection between the base station and the resource manager, and relevant information may be reported to the resource manager by defining a reasonable signaling, for example, format of the signaling may be (detection time, detected frequency point, detected bandwidth, energy of interference and signal, signal to interference plus noise ratio, other measurement items such as temperature, humid, location, altitude, and so on).

In operation S560, determining whether the resource manager has assigned new frequency point resource, if yes, proceeds to operation S570, notifying all users in this cell to switch to the new frequency point resource.

A person skilled in the art will appreciate that, operation S510 and operation S520 are optional, and the detection process may be started manually according to user's input or auto-started by the system periodically. Detection may be initiated manually by the resource manager, and periodical detection is also possible, meanwhile, it is also supported that the detection will be initiated again when and only when channel quality of the current frequency point is lower than a certain threshold.

As mentioned above, for interference of in-band signal, existing solution needs to stop service on the current frequency point periodically or non-periodically and detect all other candidate frequency points. If there are a lot of candidate frequency points, the time during which service on the current frequency point is stopped will be significantly increased. While according to one embodiment of the present invention, by using one RF channel that detects interference level of candidate frequency points, channel interference estimation on candidate frequency points may be performed without stopping current service.

The present invention is applicable to a variety of communication systems with different standards, and operates at same frequency range. These different communication systems do not know each other and there is no coordination therebetween. With the solution provided by embodiments of the present invention, it is possible to flexibly adapt to interference, reduce influence of interference as much as possible, and improve spectrum efficiency.

Various embodiments implementing the method of the present invention have been described above with reference to accompany drawings. A person skilled in the art will appreciate that, the above method may be implemented in software or hardware, or in a combination thereof. Moreover, a person skilled in the art will appreciate that, by implementing various operations in the above method in software, hardware, or a combination thereof, a system for processing interference in wireless communication at a base station may be provided. Even the system is identical to a general-purpose processing device in terms of hardware structure, due to functions of software contained therein, the system exhibits features distinguishing from the general-purpose processing device, thus forming apparatuses according to various embodiments of the present invention.

Figure 6:
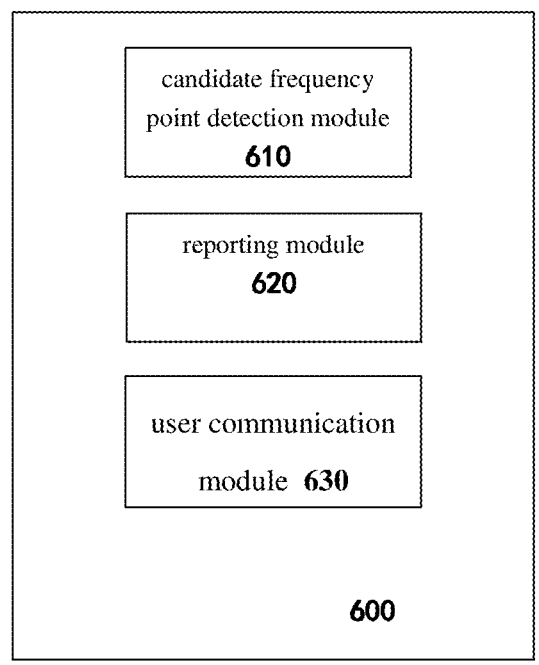
FIG. 6 is a block view of a system for processing interference according to one embodiment of the present invention.

Next, a block diagram of a system for processing interference in wireless communication at a base station according to one embodiment of the present invention will be described with reference to FIG. 6. In the base station, at least some of a plurality of RF channels operates at a current operating frequency point assigned to the base station. The system 600 includes a candidate frequency point detection module 610 configured to detect interference of one or more candidate frequency points by using at least one RF channel, wherein the one or more candidate frequency points are different from the current operating frequency point; a reporting module 620 configured to report result of detecting interference of the one or more candidate frequency points to a resource manager; and a user communication module 630 configured to, in response to the resource manager assigning one of the one or more candidate frequency points to the base station, notify user to switch from the current operating frequency point to the assigned candidate frequency point.

According to one embodiment of the present invention, the candidate frequency point detection module 610 is configured to: configure operating frequency point of the at least one RF channel as one of the one or more candidate frequency points; and detect interference level of that candidate frequency point.

According to one embodiment of the present invention, the candidate frequency point detection module 610 is configured to: set local oscillator frequency of the at least one RF channel to be different from current local oscillator frequency of RF channels operating at the current operating frequency point, such that the at least one RF channel operates at one of the one or more candidate frequency points; and detect interference level of that candidate frequency point.

According to one embodiment of the present invention, the local oscillator frequency of the at least one RF channel is provided by a local oscillator operating at a frequency different from the current local oscillator frequency.

According to one embodiment of the present invention, the local oscillator frequency of the at least one RF channel is obtained by manner of performing frequency combination on signal of the current local oscillator.

According to one embodiment of the present invention, the operating frequency point of the plurality of RF channels is provided by a multicarrier base station system, and wherein the multicarrier base station system is capable of providing different carriers to the plurality of RF channels, such that the RF channels operate at different operating frequency points.

According to one embodiment of the present invention, the candidate frequency point detection module 610 detects the interference of the candidate frequency points in response to the interference level of the current operating frequency point exceeding a certain threshold.

According to one embodiment of the present invention, the interference level is energy of interference and noise or signal to interference plus noise ratio.

According to one embodiment of the present invention, service of at least some of the plurality of RF channels operating at the current operating frequency point is not stopped while detecting interference of the one or more candidate frequency points.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for processing interference in wireless communication at a base station, wherein at least some of a plurality of RF (Radio Frequency) channels in the base station operates at a current operating frequency point assigned to the base station, the system comprising:
   a candidate frequency point detection module configured to detect interference of one or more candidate frequency points by using at least one RF channel, wherein the one or more candidate frequency points are different from the current operating frequency point, wherein the at least one RF channel operates at a frequency point different from the current operating frequency point to perform a channel quality detection;
   a reporting module configured to report result of detecting interference of the one or more candidate frequency points to a resource manager, wherein the resource manager resides in a radio network, assigns the current operating frequency point to the base station, determines whether to initiate a periodic or non-periodic interference detection, the non-periodic interference detection being performed based on the current operating frequency point exceeding a configurable threshold, and determines whether to assign a new frequency point of the one or more candidate frequency points to the base station,
   if there is no frequency point among the one or more candidate frequency points that has better quality than the current operating frequency point, then continue to use the current operating frequency point; and a user communication module configured to, in response to the resource manager assigning one of the one or more candidate frequency points to the base station, notify user to switch from the current operating frequency point to the assigned candidate frequency point.

2. The system of claim 1, wherein the candidate frequency point detection module is configured to: configure operating frequency point of the at least one RF channel as one of the one or more candidate frequency points; and detect interference level of that candidate frequency point.

3. The system of claim 1, wherein the candidate frequency point detection module is configured to: set local oscillator frequency of the at least one RF channel to be different from current local oscillator frequency of RF channels operating at the current operating frequency point, such that the at least one RF channel operates at one of the one or more candidate frequency points; and detect interference level of that candidate frequency point.

4. The system of claim 3, wherein the local oscillator frequency of the at least one RF channel is provided by a local oscillator operating at a frequency different from the current local oscillator frequency.

5. The system of claim 3, wherein the local oscillator frequency of the at least one RF channel is obtained by manner of performing frequency combination on signal of the current local oscillator.

6. The system of claim 1, wherein the operating frequency point of the plurality of RF channels is provided by a multicarrier base station system, and wherein the multicarrier base station system is capable of providing different carriers to the plurality of RF channels, such that the RF channels operate at different operating frequency points.

7. The system of claim 1, wherein the candidate frequency point detection module detects the interference of the candidate frequency points in response to the interference level of the current operating frequency point exceeding a certain threshold.

8. The system of claim 2, wherein the interference level is energy of interference and noise.

9. The system of claim 2, wherein the interference level is signal to interference plus noise ratio.

10. The system of claim 1, wherein, service of at least some of the plurality of RF channels operating at the current operating frequency point is not stopped while detecting interference of the one or more candidate frequency points.

* * * * *